United States Patent
Asai

(10) Patent No.: US 11,831,038 B2
(45) Date of Patent: Nov. 28, 2023

(54) COMPOSITION FOR LITHIUM ION SECONDARY BATTERY SEPARATOR, TWO-PART COMPOSITION FOR LITHIUM ION SECONDARY BATTERY SEPARATOR, METHOD OF PRODUCING SEPARATOR FOR LITHIUM ION SECONDARY BATTERY, AND METHOD OF PRODUCING LITHIUM ION SECONDARY BATTERY

(71) Applicant: ZEON CORPORATION, Tokyo (JP)

(72) Inventor: Kazuki Asai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 508 days.

(21) Appl. No.: 16/960,086

(22) PCT Filed: Jan. 24, 2019

(86) PCT No.: PCT/JP2019/002336
§ 371 (c)(1),
(2) Date: Jul. 6, 2020

(87) PCT Pub. No.: WO2019/151118
PCT Pub. Date: Aug. 8, 2019

(65) Prior Publication Data
US 2021/0066691 A1    Mar. 4, 2021

(30) Foreign Application Priority Data

Jan. 31, 2018 (JP) ................. 2018-015694

(51) Int. Cl.
| | |
|---|---|
| H01M 50/40 | (2021.01) |
| H01M 50/48 | (2021.01) |
| H01M 50/42 | (2021.01) |
| H01M 10/05 | (2010.01) |
| H01M 50/403 | (2021.01) |
| H01M 50/411 | (2021.01) |
| H01M 10/0525 | (2010.01) |
| H01M 50/414 | (2021.01) |
| H01M 50/489 | (2021.01) |

(52) U.S. Cl.
CPC ..... *H01M 50/403* (2021.01); *H01M 10/0525* (2013.01); *H01M 50/411* (2021.01); *H01M 50/414* (2021.01); *H01M 50/42* (2021.01); *H01M 50/489* (2021.01)

(58) Field of Classification Search
None
See application file for complete search history.

(56) References Cited

U.S. PATENT DOCUMENTS

2017/0279152 A1* 9/2017 Toyoda .................. H01M 4/80

FOREIGN PATENT DOCUMENTS

| CN | 104946123 A | | 9/2015 | |
|---|---|---|---|---|
| CN | 106575737 A | | 4/2017 | |
| CN | 104946123 | * | 2/2018 | .......... C08G 73/106 |
| JP | 2014229406 | * | 12/2014 | ........ H01M 10/0566 |
| JP | 2014229406 A | | 12/2014 | |
| KR | 20160042662 | * | 4/2016 | ............. H01M 2/14 |
| KR | 1020160042662 A | | 4/2016 | |
| WO | 2013147006 A1 | | 10/2013 | |

OTHER PUBLICATIONS

Aug. 4, 2020, International Preliminary Report on Patentability issued in the International Patent Application No. PCT/JP2019/002336.
Sep. 29, 2021, the Extended European Search Report issued by the European Patent Office in the corresponding European Patent Application No. 19747648.4.
Sol Rivera et al., Influence of Sample Processing on the Analysis of Carotenoids in Maize, Molecules, 2012, pp. 11255-11268, vol. 17, Issue 9.

* cited by examiner

*Primary Examiner* — Maria Laios
*Assistant Examiner* — Angela J Martin
(74) *Attorney, Agent, or Firm* — KENJA IP LAW PC

(57) ABSTRACT

Provided are a composition for a lithium ion secondary battery separator containing: a liquid medium; and 40 mass % or less of a first compound including a function-displaying functional group and having a molecular weight of 50,000 or less, and having a surface tension of 15 mN/m to 30 mN/m, and a two-part composition for a lithium ion secondary battery separator including: a first liquid containing a first compound and first liquid medium; and a second liquid containing a second compound and second liquid medium, wherein the first compound includes a function-displaying functional group and has a molecular weight of 50,000 or less, the second compound is reactive with the first compound and has a molecular weight of 50,000 or less, and the first and second liquids each contain the corresponding compound in a proportion of 40 mass % or less and have a surface tension of 15 mN/m to 30 mN/m.

12 Claims, No Drawings

COMPOSITION FOR LITHIUM ION SECONDARY BATTERY SEPARATOR, TWO-PART COMPOSITION FOR LITHIUM ION SECONDARY BATTERY SEPARATOR, METHOD OF PRODUCING SEPARATOR FOR LITHIUM ION SECONDARY BATTERY, AND METHOD OF PRODUCING LITHIUM ION SECONDARY BATTERY

TECHNICAL FIELD

The present disclosure relates to a composition for a lithium ion secondary battery separator, a two-part composition for a lithium ion secondary battery separator, a method of producing a separator for a lithium ion secondary battery, and a method of producing a lithium ion secondary battery.

BACKGROUND

Lithium ion secondary batteries have characteristics such as compact size, light weight, high energy-density, and the ability to be repeatedly charged and discharged, and are used in a wide variety of applications. A lithium ion secondary battery generally includes battery members such as a positive electrode, a negative electrode, and a separator that isolates the positive electrode and the negative electrode from one another and prevents short circuiting between the positive and negative electrodes.

In recent years, much effort has been focused on improving separators and other battery members with the aim of achieving even higher lithium ion secondary battery performance. In one specific example, Patent Literature (PTL) 1 describes a separator that includes a porous membrane layer containing a heavy metal-trapping compound that is provided on a separator substrate comprising a microporous membrane made from a resin. A technique is proposed of using this separator to enable trapping, by the separator, of transition metal ions that elute into electrolyte solution during charging and discharging of a secondary battery and to prevent deterioration of cycle characteristics and reduction of safety of a lithium ion secondary battery caused by transition metal ions.

CITATION LIST

Patent Literature

PTL 1: WO2013/147006A1

SUMMARY

Technical Problem

However, with the conventional technique described above in which a desired function such as metal trapping ability is imparted to a separator through the inclusion of a compound having a desired function, such as metal trapping ability, in a porous membrane provided on a separator substrate, it has only been possible to cause the display of a desired function at a surface layer part (porous membrane part) of a separator, and thus it has not been possible to cause a separator to efficiently display a desired function.

Therefore, there is demand for the development of a technique that can cause a separator to efficiently display a desired function such as metal trapping ability.

Solution to Problem

The inventor conducted diligent investigation with the aim of solving the problem set forth above. The inventor conceived an idea that by causing a substance including a functional group that can display a desired function such as metal trapping ability (hereinafter, also referred to as a "function-displaying functional group") to be supported inside pores of a separator substrate comprising a microporous membrane made from a resin, it would be possible to cause the entire separator substrate to display the desired function, and thus to cause a separator including this separator substrate to efficiently display the desired function. Through further extensive research, the inventor found that by using a composition that contains a liquid medium and a specific compound including a function-displaying functional group in specific proportions and that has a surface tension within a specific range, it is possible to achieve good support of a substance that includes a function-displaying functional group inside pores of a separator substrate and to cause a separator to efficiently display a desired function. In this manner, the inventor completed the present disclosure.

Specifically, the present disclosure aims to advantageously solve the problem set forth above, and a presently disclosed composition for a lithium ion secondary battery separator comprises: a first compound including a function-displaying functional group and having a molecular weight of 50,000 or less; and a liquid medium, wherein the first compound is contained in a proportion of 40 mass % or less, and the composition for a lithium ion secondary battery separator has a surface tension of not less than 15 mN/m and not more than 30 mN/m. When the composition for a lithium ion secondary battery separator contains, in a specific proportion, a first compound including a function-displaying functional group and having a specific molecular weight, and has a surface tension within a specific range in this manner, it is possible to cause a compound that includes a function-displaying functional group to be well introduced into pores of a separator substrate when the separator substrate is impregnated with the composition for a lithium ion secondary battery separator. This makes it possible to achieve good support of a substance that includes a function-displaying functional group inside pores of a separator substrate and to cause a separator to efficiently display a desired function.

In the presently disclosed composition for a lithium ion secondary battery separator, the function-displaying functional group preferably includes at least one type of acidic functional group. When the function-displaying functional group includes an acidic functional group, metal trapping ability can be imparted to a separator.

In the presently disclosed composition for a lithium ion secondary battery separator, the liquid medium preferably includes water. When the liquid medium includes water, a function of a separator can be further enhanced.

The presently disclosed composition for a lithium ion secondary battery separator preferably further comprises a second compound that has a molecular weight of 50,000 or less and that is reactive with the first compound, wherein the first compound and the second compound are contained in a total proportion of 40 mass % or less. When the composition for a lithium ion secondary battery separator contains, in a specific proportion, a second compound that is reactive with the first compound and that has a specific molecular weight, it is possible to cause the first compound and the second compound to be well introduced into and react inside pores of a separator substrate when the separator substrate is impregnated with the composition for a lithium ion secondary battery separator, and thus to cause strong support of a substance that includes a function-displaying functional group inside the pores of the separator substrate. By causing strong support of a substance that includes a function-displaying functional group inside pores of a separator substrate, it is possible to obtain a lithium ion secondary battery having excellent cycle characteristics.

In the presently disclosed composition for a lithium ion secondary battery separator, the second compound preferably includes at least one type of basic functional group. When the second compound includes a basic functional group, a substance that includes a function-displaying functional group can be strongly supported inside pores of a separator substrate. Moreover, by causing strong support of a substance that includes a function-displaying functional group inside pores of a separator substrate, it is possible to obtain a lithium ion secondary battery having excellent cycle characteristics.

In the presently disclosed composition for a lithium ion secondary battery separator, it is preferable that the first compound includes a macromolecular compound having a molecular weight of 3,000 or more, and the second compound is a cross-linker that cross-links molecules of the macromolecular compound. In a case in which a macromolecular compound is contained as the first compound, the inclusion of a cross-linker that cross-links molecules of the macromolecular compound as the second compound enables cross-linking of molecules of the macromolecular compound inside pores of a separator substrate, and thus enables strong support of a substance that includes a function-displaying functional group (cross-linked product of the macromolecular compound) inside the pores of the separator substrate. Moreover, by causing strong support of a substance that includes a function-displaying functional group inside pores of a separator substrate, it is possible to obtain a lithium ion secondary battery having excellent cycle characteristics.

In the presently disclosed composition for a lithium ion secondary battery separator, it is preferable that the first compound and the second compound include a polymerizable compound including at least one ethylenically unsaturated bond in a molecule thereof, and the composition for a lithium ion secondary battery separator further comprises a polymerization initiator. In a case in which the first compound and the second compound include a polymerizable compound, the inclusion of a polymerization initiator enables polymerization of the first compound and the second compound inside pores of a separator substrate, and thus enables strong support of a substance that includes a function-displaying functional group (polymer of the first compound and the second compound) inside the pores of the separator substrate. Moreover, by causing strong support of a substance that includes a function-displaying functional group inside pores of a separator substrate, it is possible to obtain a lithium ion secondary battery having excellent cycle characteristics.

Moreover, the present disclosure aims to advantageously solve the problem set forth above, and a presently disclosed two-part composition for a lithium ion secondary battery separator comprises: a first liquid containing a first compound and a first liquid medium; and a second liquid containing a second compound and a second liquid medium, wherein the first compound includes a function-displaying functional group and has a molecular weight of 50,000 or less, the second compound is reactive with the first compound and has a molecular weight of 50,000 or less, the first liquid contains the first compound in a proportion of 40 mass % or less and has a surface tension of not less than 15 mN/m and not more than 30 mN/m, and the second liquid contains the second compound in a proportion of 40 mass % or less and has a surface tension of not less than 15 mN/m and not more than 30 mN/m. By using a first liquid that contains, in a specific proportion, a first compound including a function-displaying functional group and having a specific molecular weight, and that has a surface tension within a specific range, and also using a second liquid that contains, in a specific proportion, a second compound that is reactive with the first compound and has a specific molecular weight, and that has a surface tension within a specific range in this manner, it is possible to cause the first compound and the second compound to be well introduced into and react inside pores of a separator substrate. This makes it possible to achieve good support of a substance that includes a function-displaying functional group inside the pores of the separator substrate and to cause a separator to efficiently display a desired function.

In the presently disclosed two-part composition for a lithium ion secondary battery separator, it is preferable that the function-displaying functional group of the first compound includes at least one type of acidic functional group, and the second compound includes at least one type of basic functional group. When the function-displaying functional group of the first compound includes an acidic functional group, metal trapping ability can be imparted to a separator. Moreover, in a case in which the function-displaying functional group of the first compound includes an acidic functional group, the inclusion of a basic functional group in the second compound enables strong support of a substance that includes an acidic functional group inside pores of a separator substrate. Furthermore, by causing strong support of a substance that includes a function-displaying functional group inside pores of a separator substrate, it is possible to obtain a lithium ion secondary battery having excellent cycle characteristics.

In the presently disclosed two-part composition for a lithium ion secondary battery separator, the first liquid medium and the second liquid medium preferably include water. When the first liquid medium and the second liquid medium include water, a function of a separator can be further enhanced.

Furthermore, the present disclosure aims to advantageously solve the problem set forth above, and a presently disclosed method of producing a separator for a lithium ion secondary battery comprises: a step of impregnating a separator substrate comprising a microporous membrane made from a resin with any one of the compositions for a lithium ion secondary battery separator set forth above; and a step of drying the separator substrate that has been impregnated with the composition for a lithium ion secondary battery separator. Through impregnation with the composition for a lithium ion secondary battery separator set forth above and subsequent drying in this manner, a compound that includes a function-displaying functional group can be well introduced into pores of a separator substrate. This makes it possible to achieve good support of a substance that includes a function-displaying functional group inside the pores of the separator substrate and to cause a separator to efficiently display a desired function.

Also, the present disclosure aims to advantageously solve the problem set forth above, and a presently disclosed method of producing a separator for a lithium ion secondary battery using any one of the two-part compositions for a lithium ion secondary battery separator set forth above comprises: a first step of impregnating a separator substrate comprising a microporous membrane made from a resin with one of the first liquid and the second liquid; a second step of drying the separator substrate that has been impregnated with one of the first liquid and the second liquid; a third step of impregnating the separator substrate that has been dried with the other of the first liquid and the second liquid after the second step; and a fourth step of drying the separator substrate that has been impregnated with the other of the first liquid and the second liquid. When the first to fourth steps are implemented in order in this manner, the first compound and the second compound can be well introduced into and react inside pores of the separator substrate. This makes it possible to achieve good support of a substance that includes a function-displaying functional group inside the pores of the separator substrate and to cause a separator to efficiently display a desired function.

In the presently disclosed method of producing a separator for a lithium ion secondary battery, the separator substrate may have an air resistance of not less than 10 s/100 cc-air and not more than 1,000 s/100 cc-air. By using the composition for a lithium ion secondary battery separator or the two-part composition for a lithium ion secondary battery separator set forth above, it is possible to achieve good support of a substance that includes a function-displaying functional group inside pores of a separator substrate even when the separator substrate has an air resistance of 1,000 s/100 cc-air or less. Moreover, an increase of internal resistance of a lithium ion secondary battery including the separator can be suppressed when a separator substrate having an air resistance of 10 s/100 cc-air or more is used.

Also, the present disclosure aims to advantageously solve the problem set forth above, and a presently disclosed method of producing a lithium ion secondary battery that includes a positive electrode, a negative electrode, a separator, and an electrolyte solution comprises a step of producing a separator using any one of the methods of producing a separator for a lithium ion secondary battery set forth above. By using a separator that is produced using the method of producing a separator for a lithium ion secondary battery set forth above in this manner, it is possible to obtain a lithium ion secondary battery having excellent performance.

Note that "molecular weight" referred to in the present disclosure can be measured as weight-average molecular weight by gel permeation chromatography (GPC) in the case of a compound having a molecular weight of 2,000 or more, and can be determined by identifying the molecular formula of a compound by liquid chromatography-mass spectrometry (LC-MS), nuclear magnetic resonance (NMR), or Fourier-transform infrared spectroscopy (FT-IR) and then calculating the molecular weight from the identified molecular formula in the case of a compound having a molecular weight of less than 2,000. Moreover, "surface tension" referred to in the present disclosure can be measured by the plate method (Wilhelmy method) at a temperature of 23° C. Furthermore, "air resistance" referred to in the present disclosure can be measured using an Oken Type Air-Permeability and Smoothness Tester at a temperature of 25° C.

Advantageous Effect

According to the present disclosure, it is possible to achieve good support of a substance that includes a function-displaying functional group inside pores of a separator substrate and to cause a separator to efficiently display a desired function such as metal trapping ability.

DETAILED DESCRIPTION

The following provides a detailed description of embodiments of the present disclosure.

A presently disclosed composition for a lithium ion secondary battery separator and a presently disclosed two-part composition for a lithium ion secondary battery separator can be used, for example, in production of a separator for a lithium ion secondary battery using a presently disclosed method of producing a separator for a lithium ion secondary battery. Specifically, the presently disclosed composition for a lithium ion secondary battery separator and the presently disclosed two-part composition for a lithium ion secondary battery separator can be used to introduce a compound that includes a function-displaying functional group into pores of a separator substrate comprising a microporous membrane made from a resin and to enable good support of a substance that includes a function-displaying functional group inside the pores of the separator substrate to thereby impart a desired function to a separator. Note that the "substance that includes a function-displaying functional group" that is supported inside pores of the separator substrate may be a compound that includes a function-displaying functional group or may be a derivative obtained through a reaction (for example, addition polymerization, cross-linking, condensation, etc.) of compounds that each include a function-displaying functional group or of a compound that includes a function-displaying functional group and another compound. Moreover, the function imparted to the separator is not specifically limited and may, for example, be metal trapping ability, heat shrinkage resistance, high Li ion conductivity, or the like.

Furthermore, a presently disclosed method of producing a lithium ion secondary battery can be used in production of a lithium ion secondary battery using a separator that is produced using the presently disclosed method of producing a separator for a lithium ion secondary battery.

(Composition for Lithium Ion Secondary Battery Separator)

The presently disclosed composition for a lithium ion secondary battery separator contains a liquid medium and a first compound that includes a function-displaying functional group and that has a molecular weight of 50,000 or less, and can optionally further contain a second compound that is reactive with the first compound and that has a molecular weight of 50,000 or less, and/or other additives. The presently disclosed composition for a lithium ion secondary battery separator is required to contain the first compound in a proportion of 40 mass % or less and to have a surface tension of not less than 15 mN/m and not more than 30 mN/m.

As a result of the surface tension of the presently disclosed composition for a lithium ion secondary battery separator and the molecular weight of the first compound being within the specific ranges set forth above and the proportion in which the first compound is contained in the composition being 40 mass % or less, the presently disclosed composition for a lithium ion secondary battery separator enables good introduction of the first compound that includes a function-displaying functional group into pores of a separator substrate. Moreover, as a result of the first compound including a function-displaying functional group, the presently disclosed composition for a lithium ion secondary battery separator can impart a desired function such as metal trapping ability to a separator. Also note that since the first compound has a molecular weight of 50,000 or less and is contained in the presently disclosed composition for a lithium ion secondary battery separator in a proportion of 40 mass % or less, the presently disclosed composition for a lithium ion secondary battery separator makes it possible to introduce the first compound that includes a function-displaying functional group into pores of a separator substrate without excessively blocking the pores of the separator substrate (i.e., without reducing ion conductivity of the separator substrate).

<First Compound>

The first compound contained in the composition for a separator can be any compound without any specific limitations other than being a compound that includes a function-displaying functional group and that has a molecular weight of 50,000 or less. Moreover, just one type of compound may be contained as the first compound, or two or more types of compounds may be contained as the first compound. Note that in a case in which two or more types of compounds are contained as the first compound, the total proportion in which these compounds are contained is required to be 40 mass % or less.

[Function-Displaying Functional Group]

The function-displaying functional group of the first compound can be any functional group that can display a specific function such as metal trapping. Specifically, the function-displaying functional group can, for example, be an acidic functional group such as a carboxyl group, a phosphate group, or a sulfo group. Note that an acidic functional group of the first compound may form a salt such as a sodium salt, a potassium salt, or a lithium salt. Moreover, the first compound may include just one type of function-displaying functional group in a single molecule thereof, or may include two or more types of function-displaying functional groups in a single molecule thereof.

In particular, the first compound preferably includes an acidic functional group as a function-displaying functional group in a case in which metal trapping ability is to be imparted to a separator, with inclusion of a sulfo group as a function-displaying functional group being more preferable.

The above-described first compound that includes a function-displaying functional group may be, without any specific limitations, (1) a macromolecular compound including a function-displaying functional group and having a molecular weight of 3,000 or more, (2) a polymerizable compound including a function-displaying functional group and including at least one ethylenically unsaturated bond in a molecule thereof, or (3) a function-displaying functional group-containing compound that does not correspond to (1) or (2), for example.

Note that the first compound may include just one type of compound among the compounds (1) to (3), or may include two or more types of compounds among the compounds (1) to (3).

Specifically, the macromolecular compound (1) including a function-displaying functional group and having a molecular weight of 3,000 or more may, for example, be a polymer obtained through polymerization of a monomer composition containing at least one type of acidic group-containing monomer, or a salt of such a polymer.

The acidic group-containing monomer may, without any specific limitations, be a carboxyl group-containing monomer, a sulfo group-containing monomer, a phosphate group-containing monomer, or the like, for example. More specifically, the acidic group-containing monomer may be any of those described in JP2014-229406A, for example.

In particular, the macromolecular compound (1) including a function-displaying functional group and having a molecular weight of 3,000 or more is preferably polyacrylic acid, a copolymer of acrylic acid and a sulfo group-containing monomer, or a salt of either of the preceding examples, is more preferably a copolymer of acrylic acid and a sulfo group-containing monomer or a salt thereof, is even more preferably a sodium salt of a copolymer of acrylic acid and a sulfo group-containing monomer, and is particularly preferably a sodium salt of a copolymer of acrylic acid and 2-hydroxy-3-allyoxypropane sulfonic acid.

Moreover, the polymerizable compound (2) including a function-displaying functional group and including at least one ethylenically unsaturated bond in a molecule thereof may, for example, be an acidic group-containing monomer such as described above.

In particular, the polymerizable compound (2) including a function-displaying functional group and including at least one ethylenically unsaturated bond in a molecule thereof is preferably allyl sulfonic acid, 2-acrylamido-2-methylpropane sulfonic acid (AMPS), 2-hydroxy-2-allyloxypropane sulfonic acid, styrene sulfonic acid, isoprene sulfonic acid, or a salt of any of the preceding examples, more preferably 2-acrylamido-2-methylpropane sulfonic acid or a lithium salt of styrene sulfonic acid, and even more preferably 2-acrylamido-2-methylpropane sulfonic acid.

The function-displaying functional group-containing compound (3) that does not correspond to (1) or (2) may, without any specific limitations, be dodecylbenzenesulfonic acid, dioctyl sulfosuccinic acid, or a salt of either of the preceding examples, for example. Of these examples, sodium dioctyl sulfosuccinate is preferable.

Note that it is preferable that the compound (3) is used in combination with either the compound (1) or the compound (2).

[Molecular Weight]

The molecular weight of the first compound is not specifically limited so long as it is 50,000 or less, but is preferably 20,000 or less, and more preferably 10,000 or less. When the molecular weight is not more than any of the upper limits set forth above, blocking of pores of a separator substrate by a substance that includes a function-displaying functional group and reduction of ion conductivity of the separator substrate can be sufficiently inhibited. Note that the molecular weight of the first compound is normally 50 or more.

[Proportional Content]

The proportion in which the first compound is contained is not specifically limited so long as it is 40 mass % or less, but is preferably 1 mass % or more, more preferably 3 mass % or more, even more preferably 5 mass % or more, and particularly preferably 10 mass % or more from a viewpoint of sufficiently imparting a desired function such as metal trapping ability to a separator. Moreover, the proportion in which the first compound is contained is preferably 30 mass % or less, and more preferably 20 mass % or less from a viewpoint of good introduction of the first compound into pores of a separator substrate and a viewpoint of sufficiently inhibiting blocking of the pores of the separator substrate by a substance that includes a function-displaying functional group and reduction of ion conductivity of the separator substrate.

<Liquid Medium>

The liquid medium contained in the composition for a separator can, without any specific limitations, be water, an organic solvent, or a mixture thereof. Examples of organic solvents that can be used include, but are not specifically limited to, alicyclic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; nitriles such as acetonitrile and propionitrile; ethers such as tetrahydrofuran and ethylene glycol diethyl ether; and alcohols such as methanol, ethanol, isopropanol, ethylene glycol, and ethylene glycol monomethyl ether.

Of the examples given above, water and alcohols are preferable as the liquid medium from a viewpoint of well imparting a desired function to a separator, with water and methanol being more preferable, and water being even more preferable.

<Second Compound>

The second compound that can optionally be contained in the composition for a separator can be any compound without any specific limitations other than being a compound that is reactive with the first compound and that has a molecular weight of 50,000 or less. Note that the phrase "compound that is reactive with the first compound" refers to a compound that can bond to the first compound through a reaction such as an addition polymerization reaction, a cross-linking reaction, or a condensation reaction. The second compound is normally a compound that does not include an acidic functional group.

Moreover, just one type of compound may be contained as the second compound, or two or more types of compounds may be contained as the second compound.

The second compound may, without any specific limitations, be acrylamide, methacrylamide, a carbodiimide compound, a polyfunctional epoxy compound, an oxazoline compound, a polyfunctional hydrazide compound, an isocyanate compound, a melamine compound, polyethyleneimine, polyallylamine, or the like, for example.

Of these examples, a compound including at least one type of basic functional group such as an amide group, an imide group, an amino group, or an imino group is preferable as the second compound from a viewpoint of reacting well with the first compound that includes a function-displaying functional group such as an acidic functional group and enabling strong support of a substance that includes a function-displaying functional group inside pores of a separator substrate, with acrylamide, a carbodiimide compound, polyethyleneimine, or polyallylamine being more preferable, and acrylamide or a carbodiimide compound being even more preferable.

In a case in which the composition for a lithium ion secondary battery separator contains both the first compound and the second compound, the combination of the first compound and the second compound may be a combination such as described below, but is not specifically limited thereto.

[First Preferred Example of Combination of First Compound and Second Compound]

Specifically, in a case in which the first compound includes the previously described macromolecular compound (1) including a function-displaying functional group and having a molecular weight of 3,000 or more, the second compound is preferably a compound that can function as a cross-linker that cross-links molecules of the macromolecular compound. More specifically, in a case in which the first compound includes a polymer obtained through polymerization of a monomer composition containing at least one type of acidic group-containing monomer, or a salt of such a polymer, as the aforementioned macromolecular compound, the second compound preferably includes at least one compound selected from the group consisting of a carbodiimide compound, a polyfunctional epoxy compound, an oxazoline compound, a polyfunctional hydrazide compound, an isocyanate compound, a melamine compound, polyethyleneimine, and polyallylamine as a cross-linker, more preferably includes at least one compound selected from the group consisting of a carbodiimide compound, a polyfunctional epoxy compound, an oxazoline compound, a polyfunctional hydrazide compound, an isocyanate compound, and a melamine compound as a cross-linker, and even more preferably includes a carbodiimide compound as a cross-linker.

In a case in which a macromolecular compound is contained as the first compound, the inclusion of a cross-linker that cross-links molecules of the macromolecular compound as the second compound makes it possible to cross-link molecules of the macromolecular compound inside pores of a separator substrate and to cause strong support of a substance that includes a function-displaying functional group (cross-linked product of the macromolecular compound) inside the pores of the separator substrate. Moreover, by causing strong support of a substance that includes a function-displaying functional group inside pores of a separator substrate, it is possible to obtain a lithium ion secondary battery having excellent cycle characteristics.

[Second Preferred Example of Combination of First Compound and Second Compound]

In a case in which the first compound includes the previously described polymerizable compound (2) including a function-displaying functional group and including at least one ethylenically unsaturated bond in a molecule thereof, the second compound is preferably a polymerizable compound that is a different compound to the first compound and that includes at least one ethylenically unsaturated bond in a molecule thereof, more preferably a polymerizable compound that includes at least one type of basic functional group, even more preferably acrylamide and/or methacrylamide, and particularly preferably acrylamide.

In a case in which the first compound and the second compound are polymerizable compounds, the first compound and the second compound can be polymerized inside pores of a separator substrate, and thus a substance that includes a function-displaying functional group (polymer of the first compound and the second compound) can be strongly supported inside the pores of the separator substrate. Moreover, by causing strong support of a substance that includes a function-displaying functional group inside pores of a separator substrate, it is possible to obtain a lithium ion secondary battery having excellent cycle characteristics.

[Molecular Weight]

The molecular weight of the second compound is not specifically limited so long as it is 50,000 or less, but is preferably 20,000 or less, more preferably 10,000 or less, even more preferably 2,800 or less, and particularly preferably 2,700 or less. When the molecular weight is not more than any of the upper limits set forth above, blocking of pores of a separator substrate by a substance that includes a function-displaying functional group and reduction of ion conductivity of the separator substrate can be sufficiently inhibited. Note that the molecular weight of the second compound is normally 50 or more.

[Proportional Content]

In a case in which the composition for a lithium ion secondary battery separator contains both the first compound and the second compound, the total of the proportion in which the first compound is contained and the proportion in which the second compound is contained is preferably 1 mass % or more, more preferably 3 mass % or more, even more preferably 5 mass % or more, and particularly preferably 10 mass % or more from a viewpoint of achieving good support of a substance that includes a function-displaying functional group inside pores of a separator substrate and sufficiently imparting a desired function such as metal trapping ability to a separator. Moreover, the total of the proportion in which the first compound is contained and the proportion in which the second compound is contained is preferably 40 mass % or less, more preferably 30 mass % or less, and even more preferably 20 mass % or less from a viewpoint of achieving good introduction of the first compound and the second compound into pores of a separator substrate and from a viewpoint of sufficiently inhibiting blocking of the pores of the separator substrate by a substance that includes a function-displaying functional group and reduction of ion conductivity of the separator substrate.

Note that the ratio in which the first compound and the second compound are contained in the composition for a separator can be adjusted in accordance with the types of the first compound and the second compound.

<Other Additives>

Examples of other additives (compounds other than the first compound, the second compound, and the liquid medium) that can optionally be contained in the composition for a separator include a polymerization initiator, a wetting agent for adjusting the surface tension of the composition for a separator, and the like. Note that from a viewpoint of inhibiting blocking of pores of a separator substrate and reduction of ion conductivity of the separator substrate, it is preferable that either or both of a compound having a molecular weight of more than 50,000 and a particulate substance having a particle diameter of 0.1 µm or more are not contained in the composition for a separator, and more preferable that both a compound having a molecular weight of more than 50,000 and a particulate substance having a particle diameter of 0.1 µm or more are not contained in the composition for a separator.

[Polymerization Initiator]

The composition for a separator preferably further contains a polymerization initiator in a case in which at least the first compound includes a polymerizable compound, and preferably in a case in which the first compound and the second compound include a polymerizable compound. The inclusion of a polymerization initiator in a case in which the composition for a separator contains a polymerizable compound makes it possible to polymerize the polymerizable compound inside pores of a separator substrate and to cause strong support of a substance that includes a function-displaying functional group (polymer including a structural unit derived from the first compound) in the pores of the separator substrate. Moreover, by causing strong support of a substance that includes a function-displaying functional group inside pores of a separator substrate, it is possible to obtain a lithium ion secondary battery having excellent cycle characteristics.

The polymerization initiator can be a known polymerization initiator without any specific limitations. In particular, a photopolymerization initiator is preferable, and 2-hydroxy-4'-(2-hydroxyethoxy)-2-methylpropiophenone is more preferable as the polymerization initiator.

Note that the amount of the polymerization initiator can be adjusted in accordance with the type and amount of the polymerizable compound.

[Wetting Agent]

The wetting agent can be a known surfactant such as a polyether non-ionic surfactant or a fluorine-containing surfactant without any specific limitations. Moreover, the amount of the wetting agent can be adjusted in accordance with the desired surface tension of the composition for a separator.

Note that in a case in which a compound displaying a surface active effect, such as sodium dioctyl sulfosuccinate, is contained as the first compound, the surface tension of the composition for a separator can be adjusted using this compound, without using a wetting agent.

<Surface Tension>

The surface tension of the presently disclosed composition for a lithium ion secondary battery separator is required to be not less than 15 mN/m and not more than 30 mN/m, is preferably 20 mN/m or more, and is preferably 28 mN/m or less. When the surface tension of the composition for a separator is within any of the ranges set forth above, a compound such as the first compound contained in the composition for a separator can be well introduced into pores of a separator substrate.

(Method of Producing Separator for Lithium Ion Secondary Battery Using Composition for Separator)

The presently disclosed method of producing a separator for a lithium ion secondary battery using the composition for a lithium ion secondary battery separator set forth above includes: a step (A) of impregnating a separator substrate comprising a microporous membrane made from a resin with the composition for a lithium ion secondary battery separator set forth above; and a step (B) of drying the separator substrate that has been impregnated with the composition for a lithium ion secondary battery separator in step (A). Note that in a case in which the composition for a lithium ion secondary battery separator contains both the first compound and the second compound, the presently disclosed method of producing a separator for a lithium ion secondary battery may include a step (C) of causing the first compound and the second compound to react before or after step (B). Moreover, the presently disclosed method of producing a separator for a lithium ion secondary battery may further include, after step (B), a step (D) of forming a functional layer (porous membrane layer and/or adhesive layer) on the surface of the separator substrate supporting a substance that includes a function-displaying functional group. Note that in a case in which step (C) is implemented, step (D) may be implemented after step (C) or may be implemented before step (C).

In the presently disclosed method of producing a separator for a lithium ion secondary battery, as a result of impregnation with the composition for a lithium ion secondary battery separator set forth above and subsequent drying being performed, it is possible to produce a separator that has a substance including a function-displaying functional group well supported inside pores of a separator substrate and that can efficiently display a desired function.

<Step (A)>

In step (A), the separator substrate comprising a microporous membrane made from a resin is impregnated with the composition for a lithium ion secondary battery separator set forth above, and thus the first compound and the second compound, which is an optional component, are introduced into pores of the separator substrate.

[Separator Substrate]

The separator substrate can be a microporous membrane made from a polyolefinic (polyethylene, polypropylene, polybutene, or polyvinyl chloride) resin without any specific limitations.

Note that the air resistance of the separator substrate is preferably 10 s/100 cc-air or more, and more preferably 20 s/100 cc-air or more, and is preferably 1,000 s/100 cc-air or less, and more preferably 300 s/100 cc-air or less. By using the composition for a lithium ion secondary battery separator set forth above, it is possible to achieve good support of a substance that includes a function-displaying functional group inside pores of a separator substrate even when the separator substrate has an air resistance of 1,000 s/100 cc-air or less. Moreover, an increase of internal resistance of a lithium ion secondary battery including the separator can be suppressed when a separator substrate having an air resistance of 10 s/100 cc-air or more is used.

[Impregnation]

The method by which the separator substrate is impregnated with the composition for a separator can, without any specific limitations, be a known method such as applying the composition for a separator onto the separator substrate or immersing the separator substrate in the composition for a separator.

Note that any excess of the composition for a separator attached to the surface of the separator substrate can optionally be scraped from the surface of the separator substrate before implementing step (B).

<Step (B)>

Drying of the separator substrate that has been impregnated with the composition for a separator can be performed by drying with warm, hot, or low-humidity air, drying in a vacuum, or drying through irradiation with infrared light, electron beams, or the like, for example, without any specific limitations.

Note that in a case in which the composition for a lithium ion secondary battery separator contains both the first compound and the second compound, drying of the separator substrate and reaction of the first compound and the second compound may be caused to proceed concurrently in step (B).

<Step (C)>

In the optionally implemented step (C), the first compound and the second compound can be caused to react by a known technique, such as heating or photoirradiation, in accordance with the types of the first compound and the second compound.

<Step (D)>

In the optionally implemented step (D), a functional layer can be formed by a known technique without any specific limitations. Note that a functional layer may be formed at just one side of separator substrate, or functional layers may be formed at both sides of the separator substrate.

(Two-Part Composition for Lithium Ion Secondary Battery Separator)

The presently disclosed two-part composition for a lithium ion secondary battery separator includes a first liquid containing a first compound and a first liquid medium and a second liquid containing a second compound and a second liquid medium. The first liquid is required to contain a first compound that includes a function-displaying functional group and that has a molecular weight of 50,000 or less in a proportion of 40 mass % or less and to have a surface tension of not less than 15 mN/m and not more than 30 mN/m. The second liquid is required to contain a second compound that is reactive with the first compound and that has a molecular weight of 50,000 or less in a proportion of 40 mass % or less and to have a surface tension of not less than 15 mN/m and not more than 30 mN/m.

As a result of the surface tension of the first liquid and the molecular weight of the first compound being within the specific ranges set forth above and the proportion in which the first compound is contained in the first liquid being 40 mass % or less in the presently disclosed two-part composition for a lithium ion secondary battery separator, it is possible to achieve good introduction of the first compound that includes a function-displaying functional group into pores of a separator substrate by using the first liquid. Moreover, as a result of the surface tension of the second liquid and the molecular weight of the second compound being within the specific ranges set forth above and the proportion in which the second compound is contained in the second liquid being 40 mass % or less in the presently disclosed two-part composition for a lithium ion secondary battery separator, it is possible to achieve good introduction of the second compound that is reactive with the first compound into pores of a separator substrate by using the second liquid. Therefore, by using the presently disclosed two-part composition for a lithium ion secondary battery separator, the first compound and the second compound can be well introduced into and react inside pores of a separator substrate, and thus a substance that includes a function-displaying functional group can be well supported inside the pores of the separator substrate. As a result, a desired function such as metal trapping ability can be imparted to a separator. Note that as a result of the first compound and the second compound each having a molecular weight of 50,000 or less and each being contained in a proportion of 40 mass % or less, the presently disclosed two-part composition for a lithium ion secondary battery separator makes it possible to cause support of a substance that includes a function-displaying functional group inside pores of a separator substrate without excessively blocking the pores of the separator substrate (i.e., without reducing ion conductivity of the separator substrate).

<First Liquid>

The first liquid contains the first compound and the first liquid medium, and can optionally further contain other additives. The first liquid is required to contain the first compound in a proportion of 40 mass % or less and have a surface tension of not less than 15 mN/m and not more than 30 mN/m.

[First Compound]

The first compound contained in the first liquid can, without any specific limitations, be any of the same compounds as for the first compound contained in the presently disclosed composition for a lithium ion secondary battery separator set forth above. Note that the first compound preferably includes an acidic functional group as a function-displaying functional group in a case in which metal trapping ability is to be imparted to a separator, with inclusion of a sulfo group as a function-displaying functional group being more preferable. Moreover, an acidic functional group of the first compound may form a salt such as a sodium salt, a potassium salt, or a lithium salt.

In particular, the first compound preferably includes the previously described macromolecular compound (1) including a function-displaying functional group and having a molecular weight of 3,000 or more, and more preferably includes the previously described macromolecular compound (1) including a function-displaying functional group and having a molecular weight of 3,000 or more and the previously described function-displaying functional group-containing compound (3) that does not correspond to (1) or (2).

In particular, the macromolecular compound (1) including a function-displaying functional group and having a molecular weight of 3,000 or more is preferably polyacrylic acid, a copolymer of acrylic acid and a sulfo group-containing monomer, or a salt of either of the preceding examples, is more preferably a copolymer of acrylic acid and a sulfo group-containing monomer or a salt thereof, is even more preferably a sodium salt of a copolymer of acrylic acid and a sulfo group-containing monomer, and is particularly preferably a sodium salt of a copolymer of acrylic acid and 2-hydroxy-3-allyoxypropane sulfonic acid.

Moreover, the function-displaying functional group-containing compound (3) that does not correspond to (1) or (2) is preferably sodium dioctyl sulfosuccinate.

The molecular weight of the first compound is not specifically limited so long as it is 50,000 or less, but is preferably 20,000 or less, and more preferably 10,000 or less. When the molecular weight is not more than any of the upper limits set forth above, blocking of pores of a separator substrate by a substance that includes a function-displaying functional group and reduction of ion conductivity of the separator substrate can be sufficiently inhibited. Note that the molecular weight of the first compound is normally 50 or more.

The proportion in which the first compound is contained is not specifically limited so long as it is 40 mass % or less, but is preferably 1 mass % or more, more preferably 3 mass % or more, even more preferably 5 mass % or more, and particularly preferably 10 mass % or more from a viewpoint of sufficiently imparting a desired function such as metal trapping ability to a separator. Moreover, the proportion in which the first compound is contained is preferably 30 mass % or less, and more preferably 20 mass % or less from a viewpoint of achieving good introduction of the first compound into pores of a separator substrate and a viewpoint of sufficiently inhibiting blocking of the pores of the separator substrate by a substance that includes a function-displaying functional group and reduction of ion conductivity of the separator substrate.

[First Liquid Medium]

The first liquid medium contained in the first liquid can, without any specific limitations, be any of the same compounds as for the liquid medium contained in the presently disclosed composition for a lithium ion secondary battery separator set forth above.

Of these compounds, water and alcohols are preferable as the first liquid medium from a viewpoint of well imparting a desired function to a separator, with water and methanol being more preferable, and water being even more preferable.

[Other Additives]

The other additives that can optionally be contained in the first liquid can, without any specific limitations, be any of the same additives as for the other additives that can be contained in the presently disclosed composition for a lithium ion secondary battery separator set forth above.

[Surface Tension]

The surface tension of the first liquid is required to be not less than 15 mN/m and not more than 30 mN/m, is preferably 20 mN/m or more, and is preferably 28 mN/m or less. The first compound can be well introduced into pores of a separator substrate when the surface tension of the first liquid is within any of the ranges set forth above.

<Second Liquid>

The second liquid contains the second compound and the second liquid medium, and can optionally further contain other additives. The second liquid is required to contain the second compound in a proportion of 40 mass % or less and have a surface tension of not less than 15 mN/m and not more than 30 mN/m.

[Second Compound]

The second compound contained in the second liquid can, without any specific limitations, be any of the same compounds as for the second compound that can be contained in the presently disclosed composition for a lithium ion secondary battery separator set forth above.

The second compound is preferably a compound that does not include an acidic functional group, and, from a viewpoint of reacting well with the first compound that includes a function-displaying functional group such as an acidic functional group and causing good support of a substance that includes a function-displaying functional group inside pores of a separator substrate, is preferably a compound including at least one type of basic functional group such as an amide group, an imide group, an amino group, or an imino group, and more preferably a carbodiimide compound, polyethyleneimine, or polyallylamine.

The molecular weight of the second compound is not specifically limited so long as it is 50,000 or less, but is preferably 20,000 or less, more preferably 10,000 or less, and particularly preferably 3,000 or less. When the molecular weight is not more than any of the upper limits set forth above, blocking of pores of a separator substrate by a substance that includes a function-displaying functional group and reduction of ion conductivity of the separator substrate can be sufficiently inhibited. Note that the molecular weight of the second compound is normally 50 or more.

The proportion in which the second compound is contained is not specifically limited so long as it is 40 mass % or less, but, from a viewpoint of causing good support of a substance that includes a function-displaying functional group inside pores of a separator substrate, is preferably 1 mass % or more, more preferably 3 mass % or more, and even more preferably 5 mass % or more. Moreover, the proportion in which the second compound is contained is preferably 30 mass % or less, more preferably 20 mass % or less, and even more preferably 10 mass % or less from a viewpoint of achieving good introduction of the second compound into pores of a separator substrate and a viewpoint of sufficiently inhibiting blocking of the pores of the separator substrate by a substance that includes a function-displaying functional group and reduction of ion conductivity of the separator substrate.

[Second Liquid Medium]

The second liquid medium contained in the second liquid can be, without any specific limitations, any of the same compounds as for the liquid medium contained in the presently disclosed composition for a lithium ion secondary battery separator set forth above.

Of these compounds, water and alcohols are preferable as the second liquid medium from a viewpoint of causing good support of a substance that includes a function-displaying functional group inside pores of a separator substrate, with water and methanol being more preferable, and water being even more preferable.

[Other Additives]

The other additives that can optionally be contained in the second liquid can, without any specific limitations, be any of the same additives as for the other additives that can be contained in the presently disclosed composition for a lithium ion secondary battery separator set forth above.

[Surface Tension]

The surface tension of the second liquid is required to be not less than 15 mN/m and not more than 30 mN/m, is preferably 20 mN/m or more, and is preferably 28 mN/m or less. The second compound can be well introduced into pores of a separator substrate when the surface tension of the second liquid is within any of the ranges set forth above.

(Method of Producing Separator for Lithium Ion Secondary Battery Using Two-Part Composition for Separator)

The presently disclosed method of producing a separator for a lithium ion secondary battery using the two-part composition for a lithium ion secondary battery separator set forth above includes: a first step of impregnating a separator substrate comprising a microporous membrane made from a resin with one of the first liquid and the second liquid of the two-part composition for a lithium ion secondary battery separator set forth above; a second step of drying the separator substrate that has been impregnated with one of the first liquid and the second liquid in the first step; a third step of impregnating the separator substrate that has been dried with the other of the first liquid and the second liquid after the second step; and a fourth step of drying the separator substrate that has been impregnated with the other of the first liquid and the second liquid. Note that the presently disclosed method of producing a separator for a lithium ion secondary battery may include a fifth step of causing the first compound and the second compound to react before or after the fourth step. Moreover, the presently disclosed method of producing a separator for a lithium ion secondary battery may further include, after the fourth step, a sixth step of forming a functional layer (porous membrane layer and/or adhesive layer) on the surface of the separator substrate supporting a substance that includes a function-displaying functional group. Note that in a case in which the fifth step is implemented, the sixth step may be implemented after the fifth step or may be implemented before the fifth step.

In the presently disclosed method of producing a separator for a lithium ion secondary battery, as a result of the two-part composition for a lithium ion secondary battery separator set forth above being used and the first to fourth steps being implemented in order, it is possible to produce a separator that has a substance including a function-displaying functional group well supported inside pores of a separator substrate and that can efficiently display a desired function.

<First Step>

In the first step, a separator substrate comprising a microporous membrane made from a resin is impregnated with one of the first liquid and the second liquid described above so as to introduce the first compound or the second compound into pores of the separator substrate.

Note that in the first step, it is preferable that the separator substrate is impregnated with the second liquid, and more preferable that the proportion in which the second compound is contained in the second liquid with which the separator substrate is impregnated in the first step is lower than the proportion in which the first compound is contained in the first liquid with which the separator substrate is impregnated in the third step. It is problematic to increase the proportion in which a compound (first compound or second compound) is contained in the liquid used in the first step from a viewpoint of preventing the first compound and the second compound reacting at the surface of the separator substrate to form a film when the separator substrate is impregnated with the other liquid in the third step. Therefore, impregnation with the second liquid in the first step makes it possible to impregnate the separator substrate with a first liquid containing the first compound in a high proportion in the third step, and to thereby introduce a sufficient amount of a function-displaying functional group into pores of the separator substrate.

[Separator Substrate]

The separator substrate can, without any specific limitations, be a microporous membrane made from a polyolefinic (polyethylene, polypropylene, polybutene, or polyvinyl chloride) resin.

The air resistance of the separator substrate is preferably 10 s/100 cc-air or more, and more preferably 20 s/100 cc-air or more, and is preferably 1,000 s/100 cc-air or less, and more preferably 300 s/100 cc-air or less. By using the two-part composition for a lithium ion secondary battery separator set forth above, it is possible to achieve good support of a substance that includes a function-displaying functional group inside pores of a separator substrate even when the separator substrate has an air resistance of 1,000 s/100 cc-air or less. Moreover, an increase of internal resistance of a lithium ion secondary battery including the separator can be suppressed when a separator substrate having an air resistance of 10 s/100 cc-air or more is used.

[Impregnation]

The method by which the separator substrate is impregnated with one of the first liquid and the second liquid can, without any specific limitations, be a known method such as applying one of the first liquid and the second liquid onto the separator substrate or immersing the separator substrate in one of the first liquid and the second liquid.

Note that any excess liquid attached to the surface of the separator substrate can optionally be scraped from the surface of the separator substrate before implementing the second step.

<Second Step>

Drying of the separator substrate that has been impregnated with one of the first liquid and the second liquid can be performed by drying with warm, hot, or low-humidity air, drying in a vacuum, or drying through irradiation with infrared light, electron beams, or the like, for example, without any specific limitations.

<Third Step>

In the third step, the separator substrate is impregnated with the other of the first liquid and the second liquid described above, in the same manner as in the first step with the exception that the other of the first liquid and the second liquid is used, so as to introduce the first compound or the second compound into the pores of the separator substrate.

Note that in the third step, as previously described, it is preferable that the separator substrate is impregnated with the first liquid, and more preferable that the proportion in which the first compound is contained in the first liquid with which the separator substrate is impregnated in the third step is higher than the proportion in which the second compound is contained in the second liquid with which the separator substrate is impregnated in the first step.

<Fourth Step>

In the fourth step, the separator substrate can be dried in the same manner as in the second step with the exception that the separator substrate that has been impregnated with the other of the first liquid and the second liquid in the third step is dried.

Note that in the fourth step, drying of the separator substrate and reaction of the first compound and the second compound may be caused to proceed concurrently.

<Fifth Step>

In the optionally implemented fifth step, the first compound and the second compound can be caused to react by a known technique, such as heating or photoirradiation, in accordance with the types of the first compound and the second compound.

<Sixth Step>

In the optionally implemented sixth step, a functional layer can be formed by a known technique without any specific limitations. Note that a functional layer may be formed at just one side of the separator substrate, or functional layers may be formed at both sides of the separator substrate.

(Method of Producing Lithium Ion Secondary Battery)

The presently disclosed method of producing a lithium ion secondary battery is a method of producing a lithium ion secondary battery including a positive electrode, a negative electrode, a separator, and an electrolyte solution that includes a step of producing a separator using the method of producing a separator for a lithium ion secondary battery set forth above.

Through the presently disclosed method of producing a lithium ion secondary battery, it is possible to obtain a lithium ion secondary battery that has excellent performance and that includes a separator produced using the method of producing a separator for a lithium ion secondary battery set forth above.

Note that known positive electrodes and negative electrodes can be used as the positive electrode and the negative electrode without any specific limitations.

The electrolyte solution is normally an organic electrolyte solution obtained by dissolving a supporting electrolyte in an organic solvent. The supporting electrolyte is normally a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. Note that one electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

Note that the concentration of the electrolyte in the electrolyte solution may be adjusted as appropriate. Furthermore, known additives may be added to the electrolyte solution.

The lithium ion secondary battery can be produced by, for example, stacking the positive electrode and the negative electrode with the separator in-between, performing rolling, folding, or the like of the resultant laminate, as necessary, after optionally performing pressing thereof, placing the laminate in a battery container, injecting the electrolyte solution into the battery container, and sealing the battery container. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to evaluate the molecular weight of a compound, the surface tension and impregnation properties of a composition, a first liquid, and a second liquid, the value for air resistance increase of a separator substrate, the metal trapping ability of a separator, and the cycle characteristics of a lithium ion secondary battery.

<Molecular Weight>

In the case of a compound having a molecular weight of less than 2,000, the molecular formula of the compound was identified by liquid chromatography-mass spectrometry (LC-MS), and then the molecular weight of the compound was calculated from the identified molecular formula.

In the case of a compound having a molecular weight of 2,000 or more, the molecular weight of the compound was measured by gel permeation chromatography (GPC). First, the compound that was a measurement target was added to approximately 5 mL of an eluent such that the solid content concentration was approximately 0.5 g/L and was slowly dissolved at room temperature. Once dissolution of the compound had been visually confirmed, the solution was gently filtered through a 0.45 μm filter to produce a measurement sample. The weight-average molecular weight was calculated as a reference material-equivalent value using a calibration curve prepared using a reference material.

Note that the measurement conditions were as shown below.

[Measurement Conditions]
Column: Produced by Showa Denko K.K.; product name: Shodex OHpak (SB-G, SB-807HQ, SB-806MHQ)
Eluent: 0.1 M Tris buffer solution (0.1 M of potassium chloride added)
Flow rate: 0.5 mL/min
Sample concentration: 0.05 g/L (solid content concentration)
Injection volume: 200 μL
Column temperature: 40° C.
Detector: Differential refractive index detector RI (produced by Tosoh Corporation; product name: RI-8020)
Reference material: Monodisperse pullulan (produced by Showa Denko K.K.)

<Surface Tension>

An automatic surface tensiometer "DY-300" produced by Kyowa Interface Science Co., Ltd. was used to measure surface tension by the plate method (Wilhelmy method). Note that a platinum plate was used as a plate, and measurement was performed at 23° C.

<Value for Air Resistance Increase>

A digital Oken Type Air-Permeability and Smoothness Tester (EYO-5-1M-R produced by Asahi Seiko Co., Ltd.) was used to measure the Gurley value (s/100 cc-air) of a separator substrate used in production of a separator and of a produced separator. Specifically, the increase in Gurley value ΔG (=G1−G0) was calculated from the Gurley value G0 of the "separator substrate" and the Gurley value G1 of the produced "separator", and was evaluated by the following standard. A smaller increase in Gurley value ΔG indicates that the separator has better ion conductivity.

A: Increase in Gurley value of less than 50 s/100 cc-air

B: Increase in Gurley value of not less than 50 s/100 cc-air and less than 100 s/100 cc-air C: Increase in Gurley value of 100 s/100 cc-air or more <Impregnation Properties>

A sample of an evaluation target (composition, first liquid, or second liquid) was subjected to test 1 and test 2 described below, and then an overall evaluation of impregnation properties was made by the following standard.

Test 1: An operation of immersing a separator substrate in the sample of the evaluation target and subsequently pulling out and visually inspecting the separator substrate was performed with different immersion times, and the immersion time when the resultant separator substrate visually appeared to be transparent (i.e., the opposite side thereof was visible) was recorded.

Test 2: A produced separator was observed under an electron microscope (produced by Hitachi, Ltd.; SU8220; accelerating voltage: 2 kV; magnification: ×5,000) to inspect whether pores of the separator were blocked A: Immersion time of less than 10 s and blocking not observed B: Immersion time of not less than 10 s and less than 30 s and blocking not observed C: Immersion time of 30 s or more and/or blocking observed <Metal Trapping Ability>

A produced separator was cut out to a size of 100 cm$^2$ in area for use as a test specimen, and the weight thereof was measured.

An electrolyte solution was produced by, with respect to an electrolyte solution obtained by dissolving $LiPF_6$ as a supporting electrolyte in a concentration of 1 mol/L in a solvent (ethyl methyl carbonate:ethylene carbonate=70:30 (mass ratio)), dissolving anhydrous cobalt chloride ($CoCl_2$), anhydrous nickel chloride ($NiCl_2$), and anhydrous manganese chloride ($MnCl_2$) such that the concentration of each type of metal ion was 20 mass ppm.

Next, the prepared test specimen and 10 g of the electrolyte solution in which cobalt chloride, manganese chloride, and nickel chloride had been dissolved were loaded into a glass vessel and were left at rest at a temperature of 25° C. for 5 days in a state in which the test specimen was immersed in the electrolyte solution. Thereafter, the test specimen was removed from the glass vessel and was thoroughly washed with diethyl carbonate. The weight of the test specimen was measured after sufficiently wiping off diethyl carbonate attached to the surface of the test specimen. The test specimen was subsequently loaded into a beaker made from Teflon® (Teflon is a registered trademark in Japan, other countries, or both), a mixture of sulfuric acid and nitric acid (sulfuric acid:nitric acid=0.1:2 (volume ratio)) was added thereto, and then heating was performed on a hot plate to cause concentrating until carbonization of the test specimen occurred. A mixture of nitric acid and perchloric acid (nitric acid:perchloric acid=2:0.2 (volume ratio)) was further added, a mixture of perchloric acid and hydrofluoric acid (perchloric acid:hydrofluoric acid=2:0.2 (volume ratio)) was subsequently added, and concentrating was performed until white smoke was observed. Next, a mixture of nitric acid and ultrapure water (nitric acid:ultrapure water=0.5:10 (volume ratio)) was added, and heating was performed. The contents of the beaker were left to cool and were then adjusted to a certain volume to obtain a volume-adjusted solution. The volume-adjusted solution was then used to measure the amounts of cobalt, nickel, and manganese therein using an ICP mass spectrometer (ELAN DRS II produced by PerkinElmer, Inc.). The total of the amounts of cobalt, nickel, and manganese in the volume-adjusted solution was divided by the weight of the test specimen so as to calculate the amount of transition metal (mass ppm) in the test specimen as the metal ion trapping ability, and this amount was evaluated by the following standard. A higher amount of transition metal in the test specimen indicates higher metal trapping ability per unit mass of the separator for a lithium ion secondary battery.

A: Amount of transition metal of 100 mass ppm or more

B: Amount of transition metal of not less than 50 mass ppm and less than 100 mass ppm C: Amount of transition metal of less than 50 mass ppm <Cycle Characteristics>

Ten produced lithium ion secondary batteries were each repeatedly subjected to charging and discharging in which the lithium ion secondary battery was charged to 4.2 V and discharged to 3 V by a 0.2 C constant-current method in a 60° C. atmosphere 200 times (=200 cycles), and the electric capacity of the lithium ion secondary battery was measured. Average values of the measurement results for the 10 batteries were taken as measured values and were used to determine a charge/discharge capacity retention rate (=(electric capacity at end of 200 cycles/electric capacity at end of 5 cycles)×100%) by calculating the electric capacity at the end of 200 cycles as a percentage relative to the electric capacity at the end of 5 cycles. The charge/discharge capacity retention rate was evaluated by the following standard as an evaluation criterion for cycle characteristics. A higher value for the charge/discharge capacity retention rate indicates better high-temperature cycle characteristics.

A: Charge/discharge capacity retention rate of 85% or more

B: Charge/discharge capacity retention rate of less than 85% and not less than 70%

C: Charge/discharge capacity retention rate of less than 70%

Example 1

<Production of Composition for Separator>

A Three-One Motor was used to stir 13 parts of a sodium salt of a carboxyl group/sulfo group-containing copolymer (Aqualic GL366 produced by Nippon Shokubai Co., Ltd.) and 1.7 parts of sodium dioctyl sulfosuccinate (Neocol P produced by DKS Co., Ltd.) as first compounds, 1 part of a carbodiimide compound (CARBODILITE SV-02 produced by Nisshinbo Chemical Inc.) as a second compound (cross-linker), and 84.3 parts of deionized water as a liquid medium for 30 minutes to produce 500 g, in total, of a composition for a separator.

The surface tension and impregnation properties of the produced composition for a separator were evaluated. The results are shown in Table 1.

<Production of Separator>

A separator substrate made from polyethylene (thickness: 12 μm, air resistance: 100 s/100 cc-air) was immersed for 2 minutes in the composition for a separator produced as described above, was subsequently removed from the composition, and excess of the composition for a separator on the surface thereof was scraped off. Thereafter, the separator substrate that had been immersed was dried in a 50° C. oven for 1 minute to produce a separator.

The value for air resistance increase and metal trapping ability of the produced separator were measured. The results are shown in Table 1.

<Production of Positive Electrode>

A slurry composition for a positive electrode was obtained by mixing 100 parts of $LiCoO_2$ (volume-average particle diameter (D50): 12 μm) as a positive electrode active material, 2 parts of acetylene black (HS-100 produced by Denka Company Limited) as a conductive material, 2 parts in terms of solid content of PVDF (polyvinylidene fluoride; produced by Kureha Corporation; #7208) as a binder for a positive electrode mixed material layer, and NMP (N-methylpyrrolidone) in an amount such that the total solid content concentration was 70%, and mixing these materials in a planetary mixer.

A comma coater was used to apply the obtained slurry composition for a positive electrode onto aluminum foil of 20 μm in thickness, used as a current collector, such as to have a thickness after drying of approximately 150 μm. The applied slurry composition was dried by conveying the aluminum foil inside a 60° C. oven for 2 minutes at a speed of 0.5 m/min. The resultant positive electrode web was subsequently rolled by roll pressing to obtain a positive electrode having a positive electrode mixed material layer thickness of 95 μm.

<Production of Negative Electrode>

A 5 MPa pressure vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of deionized water, and 0.5 parts of potassium peroxodisulfate as a polymerization initiator. These materials were sufficiently stirred and were then heated to 50° C. to initiate polymerization. At the point at which the polymerization conversion rate reached 96%, cooling was performed to quench the reaction to yield a mixture containing a binder (SBR) for a negative electrode mixed material layer. The mixture containing the binder for a negative electrode mixed material layer was adjusted to pH 8 through addition of 5% sodium hydroxide aqueous solution and was subsequently subjected to thermal-vacuum distillation to remove unreacted monomer. Thereafter, the mixture was cooled to 30° C. or lower to obtain a water dispersion containing the target binder for a negative electrode mixed material layer.

A mixture of 100 parts of artificial graphite (volume-average particle diameter (D50): 15.6 μm) as a negative electrode active material and 1 part in terms of solid content of a 2% aqueous solution of a sodium salt of carboxymethyl cellulose (MAC350HC produced by Nippon Paper Industries Co., Ltd.) as a thickener was adjusted to a solid content concentration of 68% with deionized water and was then mixed at 25° C. for 60 minutes. The solid content concentration was then adjusted to 62% with deionized water and a further 15 minutes of mixing was performed at 25° C. Deionized water and 1.5 parts in terms of solid content of the binder (SBR) for a negative electrode mixed material layer were added, the final solid content concentration was adjusted to 52%, and a further 10 minutes of mixing was performed. The resultant mixture was subjected to a defoaming process under reduced pressure to yield a slurry composition for a negative electrode having good fluidity.

A comma coater was used to apply the obtained slurry composition for a negative electrode onto copper foil of 20 μm in thickness, used as a current collector, such as to have a thickness after drying of approximately 150 μm. The applied slurry composition was dried by conveying the copper foil inside a 60° C. oven for 2 minutes at a speed of 0.5 m/min. The resultant negative electrode web was subsequently rolled by roll pressing to obtain a negative electrode having a negative electrode mixed material layer thickness of 100 μm.

<Production of Lithium Ion Secondary Battery>

An aluminum packing case was prepared as a battery case. The produced positive electrode was cut out as a 4.6 cm×4.6 cm square to obtain a square positive electrode. The produced separator was cut out as a 5.2 cm×5.2 cm square to obtain a square separator. The produced negative electrode was cut out as a 5 cm×5 cm square to obtain a square negative electrode. The square positive electrode was positioned inside the aluminum packing case such that a surface at the current collector side of the positive electrode was in contact with the packing case. The square separator was positioned on a surface at the positive electrode mixed material layer side of the square positive electrode such that the square separator was in contact with the square positive electrode. The square negative electrode was positioned on the separator such that a surface at the negative electrode mixed material layer side of the negative electrode faced the separator. Next, electrolyte solution (solvent (volume ratio): ethylene carbonate (EC)/ethyl methyl carbonate (EMC)/vinylene carbonate (VC)=68.5/30/1.5; electrolyte: $LiPF_6$ of 1 M in concentration) was injected such that no air remained. The aluminum packing case was then closed by heat sealing at 150° C. to produce a lithium ion secondary battery.

The high-temperature cycle characteristics of the lithium ion secondary battery were evaluated.

Example 2

A composition for a separator, a separator, a positive electrode, a negative electrode, and a lithium ion secondary battery were produced in the same way as in Example 1 with the exception that a sodium salt of polyacrylic acid (ARON T50 produced by Toagosei Co., Ltd.) was used instead of the sodium salt of a carboxyl group/sulfo group-containing copolymer (Aqualic GL366 produced by Nippon Shokubai Co., Ltd.) in production of the composition for a separator. Measurements and evaluations were performed in the same way as in Example 1. The results are shown in Table 1.

Example 3

A composition for a separator, a separator, a positive electrode, a negative electrode, and a lithium ion secondary battery were produced in the same way as in Example 1 with the exception that a sodium salt of a carboxyl group/sulfo group-containing copolymer produced as described below was used instead of the sodium salt of a carboxyl group/sulfo group-containing copolymer "Aqualic GL366" (produced by Nippon Shokubai Co., Ltd.) in production of the composition for a separator. Measurements and evaluations were performed in the same way as in Example 1. The results are shown in Table 1.

[Production of Sodium Salt of Carboxyl Group/Sulfo Group-Containing Copolymer]

Acrylic acid and sodium 3-allyloxy-2-hydroxy-1-propanesulfonate were weighed into an 80 mL glass ampoule as monomers such that the mass ratio thereof was 75/50, a stirrer chip and degassed deionized water were added such that the monomer concentration was 15% and the total volume was 60 mL, and then stirring was performed. Thereafter, the glass ampoule was heated to the boiling point/reflux temperature, and then 2 g of 5% ammonium persulfate aqueous solution was injected by a syringe five times at intervals of 10 minutes. Once the fifth injection had been completed, the boiling point/reflux temperature was maintained for 70 minutes, and then cooling was performed to room temperature to yield an aqueous solution of a sodium salt of a carboxyl group/sulfo group-containing copolymer.

Examples 4 to 6

A composition for a separator, a separator, a positive electrode, a negative electrode, and a lithium ion secondary battery were produced in the same way as in Example 1 with the exception that the amounts of the sodium salt of a carboxyl group/sulfo group-containing copolymer (Aqualic GL366 produced by Nippon Shokubai Co., Ltd.), sodium dioctyl sulfosuccinate (Neocol P produced by DKS Co., Ltd.), and deionized water used in production of the composition for a separator were changed as shown in Table 1. Measurements and evaluations were performed in the same way as in Example 1. The results are shown in Table 1.

Example 7

A composition for a separator, a separator, a positive electrode, a negative electrode, and a lithium ion secondary battery were produced in the same way as in Example 1 with the exception that the composition for a separator was produced as described below. Measurements and evaluations were performed in the same way as in Example 1. The results are shown in Table 1.
<Production of Composition for Separator>
A Three-One Motor was used to stir 5 parts of polyacrylic acid (JURYMER AC-10P produced by Toagosei Co., Ltd.) as a first compound and 95 parts of methanol as a liquid medium for 30 minutes to produce 500 g, in total, of a composition for a separator.

Example 8

A composition for a separator, a separator, a positive electrode, a negative electrode, and a lithium ion secondary battery were produced in the same way as in Example 1 with the exception that the composition for a separator and the separator were produced as described below. Measurements and evaluations were performed in the same way as in Example 1. The results are shown in Table 1.
<Production of Composition for Separator>
A Three-One Motor was used to stir 9.8 parts of 2-acrylamido-2-methylpropane sulfonic acid (AMPS) and 1.7 parts of sodium dioctyl sulfosuccinate (Neocol P produced by DKS Co., Ltd.) as first compounds, 3.2 parts of acrylamide as a second compound, 0.3 parts of 2-hydroxy-4'-(2-hydroxyethoxy)-2-methylpropiophenone as a photopolymerization initiator, and 85 parts of deionized water as a liquid medium for 30 minutes to produce 500 g, in total, of a composition for a separator.
<Production of Separator>
A separator substrate made from polyethylene (thickness: 12 μm; air resistance: 100 s/100 cc-air) was immersed for 2 minutes in the composition for a separator produced as described above, was subsequently removed from the composition, and excess of the composition for a separator on the surface thereof was scraped off. The separator substrate was subsequently sandwiched between polyethylene terephthalate (PET) films of 50 μm in thickness and was subjected to UV treatment using a conveyer-type UV irradiation apparatus (ECS-401XN2-1401 produced by EYE GRAPHICS Co., Ltd.; illuminant: high pressure mercury lamp). After irradiation, the separator substrate was removed from the PET films and was dried in a 50° C. oven for 1 minute to produce a separator.

Examples 9 and 10

A composition for a separator, a separator, a positive electrode, a negative electrode, and a lithium ion secondary battery were produced in the same way as in Example 8 with the exception that the amounts of 2-acrylamido-2-methylpropane sulfonic acid, acrylamide, and deionized water used in production of the composition for a separator were changed as shown in Table 1. Measurements and evaluations were performed in the same way as in Example 1. The results are shown in Table 1.

Example 11

A composition for a separator, a separator, a positive electrode, a negative electrode, and a lithium ion secondary battery were produced in the same way as in Example 8 with the exception that lithium styrene sulfonate (LiSS) was used instead of 2-acrylamido-2-methylpropane sulfonic acid in production of the composition for a separator. Measurements and evaluations were performed in the same way as in Example 1. The results are shown in Table 1.

Comparative Example 1

A composition for a separator, a separator, a positive electrode, a negative electrode, and a lithium ion secondary battery were produced in the same way as in Example 1 with the exception that, in production of the composition for a separator, 10 parts of an ammonium salt of polyacrylic acid (ARON A-30 produced by Toagosei Co., Ltd.) was used instead of 13 parts of the sodium salt of a carboxyl group/sulfo group-containing copolymer (Aqualic GL366 produced by Nippon Shokubai Co., Ltd.), 3 parts of an ethylene oxide/propylene oxide copolymer (NOPTECHS ED-052 produced by San Nopco Limited) as a polyether non-ionic surfactant was used instead of 1.7 parts of sodium dioctyl sulfosuccinate (Neocol P produced by DKS Co., Ltd.), and the amount of deionized water was changed to 86 parts. Measurements and evaluations were performed in the same way as in Example 1. The results are shown in Table 1.

Comparative Example 2

A composition for a separator, a separator, a positive electrode, a negative electrode, and a lithium ion secondary battery were produced in the same way as in Example 2 with the exception that, in production of the composition for a separator, sodium dioctyl sulfosuccinate (Neocol P produced by DKS Co., Ltd.) was not used, and the amount of deionized water was changed to 86 parts. Measurements and evaluations were performed in the same way as in Example 1. The results are shown in Table 1.

Comparative Example 3

A composition for a separator, a separator, a positive electrode, a negative electrode, and a lithium ion secondary battery were produced in the same way as in Example 1 with the exception that the amounts of the sodium salt of a carboxyl group/sulfo group-containing copolymer (Aqualic GL366 produced by Nippon Shokubai Co., Ltd.), sodium dioctyl sulfosuccinate (Neocol P produced by DKS Co., Ltd.), and deionized water used in production of the composition for a separator were changed as shown in Table 1. Measurements and evaluations were performed in the same way as in Example 1. The results are shown in Table 1.

Comparative Example 4

A composition for a separator, a separator, a positive electrode, a negative electrode, and a lithium ion secondary battery were produced in the same way as in Example 1 with the exception that the composition for a separator was produced as described below. Measurements and evaluations were performed in the same way as in Example 1. The results are shown in Table 1.

<Production of Composition for Separator>

A Three-One Motor was used to stir 13 parts of polyvinyl alcohol (JF-02 produced by JAPAN VAM & POVAL Co., Ltd.), which is a compound not including a function-displaying functional group, 2 parts of an ethylene oxide/propylene oxide copolymer (NOPTECHS ED-052 produced by San Nopco Limited) as a polyether non-ionic surfactant, and 85 parts of deionized water as a liquid medium for 30 minutes to produce 500 g, in total, of a composition for a separator.

TABLE 1

| | | | Example 1 | Example 2 | Example 3 | Example 4 | Example 5 | Example 6 | Example 7 | Example 8 | Example 9 | Example 10 | Example 11 | Comparative Example 1 | Comparative Example 2 | Comparative Example 3 | Comparative Example 4 |
|---|---|---|---|---|---|---|---|---|---|---|---|---|---|---|---|---|---|
| Composition for separator | First compound | Carboxyl group/sulfo group-containing copolymer Na salt (molecular weight: 6,000) [parts by mass] | 13 | — | — | 13 | 22 | 2 | — | — | — | — | — | — | — | 40 | — |
| | | Carboxyl group/sulfo group-containing copolymer Na salt (molecular weight: 15,000) [parts by mass] | — | — | 13 | — | — | — | — | — | — | — | — | — | — | — | — |
| | | Polyacrylic acid Na salt (molecular weight: 6,000) [parts by mass] | — | 13 | — | — | — | — | — | — | — | — | — | — | 13 | — | — |
| | | Polyacrylic acid (molecular weight: 9,000) [parts by mass] | — | — | — | — | — | — | 5 | — | — | — | — | — | — | — | — |
| | | Polyacrylic acid ammonium salt (molecular weight: 100,000) [parts by mass] | — | — | — | — | — | — | — | — | — | — | — | 10 | — | — | — |
| | | 2-Acrylamido-2-methylpropane sulfonic acid (molecular weight: 207) [parts by mass] | — | — | — | — | — | — | — | 9.8 | 18 | 6.5 | — | — | — | — | — |
| | | Lithium styrene sulfonate (molecular weight: 191) [parts by mass] | — | — | — | — | — | — | — | — | — | — | 9.8 | — | — | — | — |
| | | Sodium dioctyl sulfosuccinate (molecular weight: 412) [parts by mass] | 1.7 | 1.7 | 1.7 | 1 | 1.5 | 2 | — | 1.7 | 1.7 | 1.7 | 1.7 | — | — | 1.5 | — |
| | | Total content [parts by mass] | 14.7 | 14.7 | 14.7 | 14 | 23.5 | 4 | 5 | 11.5 | 19.7 | 8.2 | 11.5 | 10 | 13 | 41.5 | — |
| | Second compound | Carbodiimide compound (molecular weight: 2,700) [parts by mass] | 1 | 1 | 1 | 1 | 1 | 1 | — | — | — | — | — | 1 | 1 | 1 | — |
| | | Acrylamide (molecular weight: 71) [parts by mass] | — | — | — | — | — | — | — | 3.2 | 6 | 6.5 | 3.2 | — | — | — | — |

TABLE 1-continued

| | | Example 1 | Example 2 | Example 3 | Example 4 | Example 5 | Example 6 | Example 7 | Example 8 | Example 9 | Example 10 | Example 11 | Comparative Example 1 | Comparative Example 2 | Comparative Example 3 | Comparative Example 4 |
|---|---|---|---|---|---|---|---|---|---|---|---|---|---|---|---|---|
| | Polyvinyl alcohol (molecular weight: 9,000) [parts by mass] | — | — | — | — | — | — | — | — | — | — | — | — | — | — | 13 |
| Liquid medium | Water [parts by mass] | 84.3 | 84.3 | 84.3 | 85 | 75.5 | 95 | — | 85 | 74 | 85 | 85 | 86 | 86 | 57.5 | 85 |
| | Methanol [parts by mass] | — | — | — | — | — | — | 95 | — | — | — | — | — | — | — | — |
| | Photopolymerization initiator [parts by mass] | — | — | — | — | — | — | — | 0.3 | 0.3 | 0.3 | 0.3 | — | — | — | — |
| | Polyether non-ionic surfactant [parts by mass] | — | — | — | — | — | — | — | — | — | — | — | 3 | — | — | 2 |
| | Fluorine-containing surfactant [parts by mass] | — | — | — | — | — | — | — | — | — | — | — | — | — | — | — |
| | Surface tension [mN/m] | 26 | 26 | 26 | 29 | 26 | 26 | 22 | 26 | 25 | 26 | 26 | 26 | 55 | 26 | 35 |
| Evaluation | Value for air resistance increase | A | A | B | B | B | A | B | A | B | A | A | C | C | C | C |
| | Impregnation properties | A | A | A | B | B | A | A | A | A | A | A | C | C | C | C |
| | Metal trapping ability | A | B | A | A | A | B | B | A | A | B | B | B | B | A | C |
| | High-temperature cycle characteristics | A | A | A | A | A | A | A | A | B | A | A | C | C | C | C |

It can be seen from Table 1 that a composition for a separator having excellent impregnation properties, a separator having excellent metal trapping ability, and a secondary battery having excellent cycle characteristics were obtained in each of Examples 1 to 11. On the other hand, impregnation properties of a composition for a separator and cycle characteristics of a secondary battery deteriorated in each of Comparative Examples 1 to 3, and metal trapping ability of a separator and cycle characteristics of a secondary battery deteriorated in Comparative Example 4.

Example 12

A two-part composition for a separator, a separator, a positive electrode, a negative electrode, and a lithium ion secondary battery were produced in the same way as in Example 1 with the exception that the two-part composition for a separator and the separator were produced as described below. Measurements and evaluations were performed in the same way as in Example 1. The results are shown in Table 2.
<Production of Two-Part Composition for Separator>
[Production of First Liquid]
A Three-One Motor was used to stir 13 parts of a sodium salt of a carboxyl group/sulfo group-containing copolymer (Aqualic GL366 produced by Nippon Shokubai Co., Ltd.) and 1.7 parts of sodium dioctyl sulfosuccinate (Neocol P produced by DKS Co., Ltd.) as first compounds and 85.3 parts of deionized water as a first liquid medium for 30 minutes to produce 500 g, in total, of a first liquid.

The surface tension and impregnation properties of the produced first liquid were evaluated. The results are shown in Table 2.
[Production of Second Liquid]
A Three-One Motor was used to stir 6 parts of polyethyleneimine (SP-018 produced by Nippon Shokubai Co., Ltd.) as a second compound, 1 part of fluorinated ethylene oxide (S-243 produced by AGC Seimi Chemical Co., Ltd.) as a fluorine-containing surfactant, and 93 parts of deionized water as a second liquid medium for 30 minutes to produce 500 g, in total, of a second liquid.

The surface tension and impregnation properties of the produced second liquid were evaluated. The results are shown in Table 2.
<Production of Separator>
A separator substrate made from polyethylene (thickness: 12 μm; air resistance: 100 s/100 cc-air) was immersed for 2 minutes in the second liquid produced as described above, was subsequently removed from the second liquid, and excess of the second liquid on the surface thereof was scraped off. Thereafter, the separator substrate was dried in a 50° C. oven for 1 minute.

Next, the dried separator substrate was immersed for 2 minutes in the first liquid produced as described above, was subsequently removed from the first liquid, and excess of the first liquid on the surface thereof was scraped off. Thereafter, the separator substrate was dried in a 50° C. oven for 1 minute.

The value for air resistance increase and metal trapping ability of the separator produced in this manner were measured. The results are shown in Table 2.

Example 13

A two-part composition for a separator, a separator, a positive electrode, a negative electrode, and a lithium ion secondary battery were produced in the same way as in Example 12 with the exception that a sodium salt of polyacrylic acid (ARON T50 produced by Toagosei Co., Ltd.) was used instead of the sodium salt of a carboxyl group/sulfo group-containing copolymer (Aqualic GL366 produced by Nippon Shokubai Co., Ltd.) in production of the first liquid, and polyallylamine (PAA-03 produced by Nittobo Medical Co., Ltd.) was used instead of polyethyleneimine (SP-018 produced by Nippon Shokubai Co., Ltd.) in production of the second liquid. Measurements and evaluations were performed in the same way as in Example 12. The results are shown in Table 2.

Example 14

A two-part composition for a separator, a separator, a positive electrode, a negative electrode, and a lithium ion secondary battery were produced in the same way as in Example 12 with the exception that a carbodiimide compound (CARBODILITE SV-02 produced by Nisshinbo Chemical Inc.) was used instead of polyethyleneimine (SP-018 produced by Nippon Shokubai Co., Ltd.) in production of the second liquid. Measurements and evaluations were performed in the same way as in Example 12. The results are shown in Table 2.

Example 15

A two-part composition for a separator, a separator, a positive electrode, a negative electrode, and a lithium ion secondary battery were produced in the same way as in Example 12 with the exception that a sodium salt of a carboxyl group/sulfo group-containing copolymer produced in the same way as in Example 3 was used instead of the sodium salt of a carboxyl group/sulfo group-containing copolymer "Aqualic GL366" (produced by Nippon Shokubai Co., Ltd.) in production of the first liquid, and polyethyleneimine "SP-200" (produced by Nippon Shokubai Co., Ltd.) was used instead of polyethyleneimine "SP-018" (produced by Nippon Shokubai Co., Ltd.) in production of the second liquid. Measurements and evaluations were performed in the same way as in Example 12. The results are shown in Table 2.

Example 16

A two-part composition for a separator, a separator, a positive electrode, a negative electrode, and a lithium ion secondary battery were produced in the same way as in Example 12 with the exception that the two-part composition for a separator was produced as described below. Measurements and evaluations were performed in the same way as in Example 12. The results are shown in Table 2.
<Production of Two-Part Composition for Separator>
[Production of First Liquid]
A Three-One Motor was used to stir 13 parts of a sodium salt of a carboxyl group/sulfo group-containing copolymer (Aqualic GL366 produced by Nippon Shokubai Co., Ltd.) as a first compound, 2 parts of an ethylene oxide/propylene oxide copolymer (NOPTECHS ED-052 produced by San Nopco Limited) as a polyether non-ionic surfactant, and 85 parts of deionized water as a first liquid medium for 30 minutes to produce 500 g, in total, of a first liquid.
[Production of Second Liquid]
A Three-One Motor was used to stir 6 parts of polyethyleneimine (SP-018 produced by Nippon Shokubai Co., Ltd.) as a second compound, an ethylene oxide/propylene oxide copolymer (NOPTECHS ED-052 produced by San Nopco Limited) as a polyether non-ionic surfactant, and 92 parts of deionized water as a second liquid medium for 30 minutes to produce 500 g, in total, of a second liquid.

Examples 17 and 18

A two-part composition for a separator, a separator, a positive electrode, a negative electrode, and a lithium ion secondary battery were produced in the same way as in Example 12 with the exception that the amounts of the sodium salt of a carboxyl group/sulfo group-containing copolymer (Aqualic GL366 produced by Nippon Shokubai Co., Ltd.), sodium dioctyl sulfosuccinate (Neocol P produced by DKS Co., Ltd.), and deionized water used in production of the first liquid were changed as shown in Table 2, and the amounts of polyethyleneimine (SP-018 produced by Nippon Shokubai Co., Ltd.) and deionized water used in production of the second liquid were changed as shown in Table 2. Measurements and evaluations were performed in the same way as in Example 12. The results are shown in Table 2.

Comparative Example 5

A two-part composition for a separator, a separator, a positive electrode, a negative electrode, and a lithium ion secondary battery were produced in the same way as in Example 12 with the exception that, in production of the first liquid, an ammonium salt of polyacrylic acid (ARON A-30 produced by Toagosei Co., Ltd.) was used instead of the sodium salt of a carboxyl group/sulfo group-containing copolymer (Aqualic GL366 produced by Nippon Shokubai Co., Ltd.), 3 parts of an ethylene oxide/propylene oxide copolymer (NOPTECHS ED-052 produced by San Nopco Limited) as a polyether non-ionic surfactant was used instead of 1.7 parts of sodium dioctyl sulfosuccinate (Neocol P produced by DKS Co., Ltd.), and the amount of deionized water was changed to 84 parts, and, in production of the second liquid, polyethyleneimine "HM-2000" (produced by Nippon Shokubai Co., Ltd.) was used instead of polyethyleneimine "SP-018" (produced by Nippon Shokubai Co., Ltd.). Measurements and evaluations were performed in the same way as in Example 12. The results are shown in Table 2.

Comparative Example 6

A two-part composition for a separator, a separator, a positive electrode, a negative electrode, and a lithium ion secondary battery were produced in the same way as in Example 12 with the exception that the two-part composition for a separator was produced as described below. Measurements and evaluations were performed in the same way as in Example 12. The results are shown in Table 2.
<Production of Two-Part Composition for Separator>
[Production of First Liquid]
A Three-One Motor was used to stir 13 parts of a sodium salt of polyacrylic acid (ARON T50 produced by Toagosei Co., Ltd.) as a first compound, 0.5 parts of an ethylene oxide/propylene oxide copolymer (NOPTECHS ED-052 produced by San Nopco Limited) as a polyether non-ionic surfactant, and 86.5 parts of deionized water as a first liquid medium for 30 minutes to produce 500 g, in total, of a first liquid.
[Production of Second Liquid]
A Three-One Motor was used to stir 6 parts of polyethyleneimine (SP-018 produced by Nippon Shokubai Co., Ltd.) as a second compound, 0.5 parts of an ethylene oxide/propylene oxide copolymer (NOPTECHS ED-052 produced by San Nopco Limited) as a polyether non-ionic surfactant, and 93.5 parts of deionized water as a second liquid medium for 30 minutes to produce 500 g, in total, of a second liquid.

Comparative Example 7

A two-part composition for a separator, a separator, a positive electrode, a negative electrode, and a lithium ion secondary battery were produced in the same way as in Example 12 with the exception that the amounts of the sodium salt of a carboxyl group/sulfo group-containing copolymer (Aqualic GL366 produced by Nippon Shokubai Co., Ltd.), sodium dioctyl sulfosuccinate (Neocol P produced by DKS Co., Ltd.), and deionized water used in production of the first liquid were changed as shown in Table 2, and the amounts of polyethyleneimine (SP-018 produced by Nippon Shokubai Co., Ltd.) and deionized water used in production of the second liquid were changed as shown in Table 2. Measurements and evaluations were performed in the same way as in Example 12. The results are shown in Table 2.

It can be seen from Table 2 that a two-part composition for a separator having excellent impregnation properties, a separator having excellent metal trapping ability, and a secondary battery having excellent cycle characteristics were obtained in each of Examples 12 to 18. On the other hand, impregnation properties of a composition for a separator and cycle characteristics of a secondary battery deteriorated in each of Comparative Examples 5 to 7.

INDUSTRIAL APPLICABILITY

According to the present disclosure, it is possible to achieve good support of a substance including a function-

TABLE 2

| | | | | Example 12 | Example 13 | Example 14 | Example 15 | Example 16 | Example 17 | Example 18 | Comparative Example 5 | Comparative Example 6 | Comparative Example 7 |
|---|---|---|---|---|---|---|---|---|---|---|---|---|---|
| Two-part composition for separator | First liquid | First compound | Carboxyl group/sulfo group-containing copolymer Na salt (molecular weight: 6,000) [parts by mass] | 13 | — | 13 | — | 13 | 22 | 2 | — | — | 40 |
| | | | Carboxyl group/sulfo group-containing copolymer Na salt (molecular weight: 15,000) [parts by mass] | — | — | — | 13 | — | — | — | — | — | — |
| | | | Polyacrylic acid Na salt (molecular weight: 6,000) [parts by mass] | — | 13 | — | — | — | — | — | — | 13 | — |
| | | | Polyacrylic acid ammonium salt (molecular weight: 100,000) [parts by mass] | — | — | — | — | — | — | — | 13 | — | — |
| | | | Sodium dioctyl sulfosuccinate (molecular weight: 412) [parts by mass] | 1.7 | 1.7 | 1.7 | 1.7 | — | 1.5 | 2 | — | — | 1.5 |
| | | | Total content [parts by mass] | 14.7 | 14.7 | 14.7 | 14.7 | 13 | 23.5 | 4 | 13 | 13 | 41.5 |
| | | First liquid medium | Water [parts by mass] | 85.3 | 85.3 | 85.3 | 85.3 | 85 | 76.5 | 96 | 84 | 86.5 | 58.5 |
| | | | Polyether non-ionic surfactant [parts by mass] | — | — | — | — | 2 | — | — | 3 | 0.5 | — |
| | | | Fluorine-containing surfactant [parts by mass] | — | — | — | — | — | — | — | — | — | — |
| | | | Surface tension [mN/m] | 26 | 26 | 26 | 26 | 29 | 26 | 26 | 26 | 35 | 26 |
| | Second liquid | Second compound | Polyethyleneimine (molecular weight: 1,800) [parts by mass] | 6 | — | — | — | 6 | 22 | 1 | — | 6 | 41 |
| | | | Polyethyleneimine (molecular weight: 10,000) [parts by mass] | — | — | — | 6 | — | — | — | — | — | — |
| | | | Polyethyleneimine (molecular weight: 30,000) [parts by mass] | — | — | — | — | — | — | — | 6 | — | — |
| | | | Polyallylamine (molecular weight: 3,000) [parts by mass] | — | 6 | — | — | — | — | — | — | — | — |
| | | | Cathodic compound (molecular weight: 2,700) [parts by mass] | — | — | 6 | — | — | — | — | — | — | — |
| | | | Total content [parts by mass] | 6 | 6 | 6 | 6 | 6 | 22 | 1 | 6 | 6 | 41 |
| | | Second liquid medium | Water [parts by mass] | 93 | 93 | 93 | 93 | 92 | 77 | 98 | 93 | 93.5 | 58 |
| | | | Polyether non-ionic surfactant [parts by mass] | — | — | — | — | 2 | — | — | — | 0.5 | — |
| | | | Fluorine-containing surfactant [parts by mass] | 1 | 1 | 1 | 1 | — | 1 | 1 | 1 | — | 1 |
| | | | Surface tension [mN/m] | 24 | 24 | 24 | 24 | 29 | 26 | 26 | 26 | 35 | 26 |
| Evaluation | | | Value for air resistance increase | A | A | A | B | B | B | A | C | C | C |
| | | | Impregnation properties (first liquid) | A | A | A | A | B | B | A | C | C | C |
| | | | Impregnation properties (second liquid) | A | A | A | A | B | B | A | C | C | C |
| | | | Metal trapping ability | A | B | A | A | A | A | B | B | B | A |
| | | | High-temperature cycle characteristics | A | A | A | A | A | A | A | C | C | C | displaying functional group inside pores of a separator substrate and to cause a separator to efficiently display a desired function such as metal trapping ability.

The invention claimed is:

1. A composition for a lithium ion secondary battery separator comprising:
   a first compound including a function-displaying functional group and having a molecular weight of 50,000 or less; and
   a liquid medium, wherein
   the function-displaying functional group includes at least one type of acidic functional group,
   the first compound is at least one compound selected from the group consisting of polyacrylic acid having a molecular weight of 3,000 or more, a copolymer of acrylic acid and a sulfo group-containing monomer having a molecular weight of 3,000 or more, allyl sulfonic acid, 2-acrylamido-2-methylpropane sulfonic acid, 2-hydroxy-2-allyloxypropane sulfonic acid, styrene sulfonic acid, isoprene sulfonic acid, dodecylbenzenesulfonic acid, dioctyl sulfosuccinic acid, and a salt of either of the preceding compounds, and contained in a proportion of 3 mass % or more and 40 mass % or less, and
   the composition for a lithium ion secondary battery separator has a surface tension of not less than 15 mN/m and not more than 30 mN/m.

2. The composition for a lithium ion secondary battery separator according to claim 1, wherein the liquid medium includes water.

3. The composition for a lithium ion secondary battery separator according to claim 1, further comprising a second compound that has a molecular weight of 50,000 or less and that is reactive with the first compound, wherein
   the first compound and the second compound are contained in a total proportion of 40 mass % or less.

4. The composition for a lithium ion secondary battery separator according to claim 3, wherein the second compound includes at least one type of basic functional group.

5. The composition for a lithium ion secondary battery separator according to claim 3, wherein
   the second compound is a cross-linker that cross-links molecules of the macromolecular compound.

6. A method of producing a separator for a lithium ion secondary battery comprising:
   a step of impregnating a separator substrate comprising a microporous membrane made from a resin with the composition for a lithium ion secondary battery separator according to claim 1; and
   a step of drying the separator substrate that has been impregnated with the composition for a lithium ion secondary battery separator.

7. The method of producing a separator for a lithium ion secondary battery according to claim 6, wherein the separator substrate has an air resistance of not less than 10 s/100 cc-air and not more than 1,000 s/100 cc-air.

8. A method of producing a lithium ion secondary battery that includes a positive electrode, a negative electrode, a separator, and an electrolyte solution, comprising a step of producing a separator using the method of producing a separator for a lithium ion secondary battery according to claim 6.

9. A two-part composition for a lithium ion secondary battery separator comprising:
   a first liquid containing a first compound and a first liquid medium; and
   a second liquid containing a second compound and a second liquid medium, wherein
   the first compound includes a function-displaying functional group and has a molecular weight of 50,000 or less,
   the function-displaying functional group includes at least one type of acidic functional group,
   the second compound is reactive with the first compound and has a molecular weight of 50,000 or less,
   the first compound is at least one compound selected from the group consisting of polyacrylic acid having a molecular weight of 3,000 or more, a copolymer of acrylic acid and a sulfo group-containing monomer having a molecular weight of 3,000 or more, allyl sulfonic acid, 2-acrylamido-2-methylpropane sulfonic acid, 2-hydroxy-2-allyloxypropane sulfonic acid, styrene sulfonic acid, isoprene sulfonic acid, dodecylbenzenesulfonic acid, dioctyl sulfosuccinic acid, and a salt of either of the preceding compounds,
   the first liquid contains the first compound in a proportion of 3 mass % or more and 40 mass % or less and has a surface tension of not less than 15 mN/m and not more than 30 mN/m, and
   the second liquid contains the second compound in a proportion of 40 mass % or less and has a surface tension of not less than 15 mN/m and not more than 30 mN/m.

10. The two-part composition for a lithium ion secondary battery separator according to claim 9, wherein
    the second compound includes at least one type of basic functional group.

11. The two-part composition for a lithium ion secondary battery separator according to claim 9, wherein the first liquid medium and the second liquid medium include water.

12. A method of producing a separator for a lithium ion secondary battery using the two-part composition for a lithium ion secondary battery separator according to claim 9, comprising:
    a first step of impregnating a separator substrate comprising a microporous membrane made from a resin with one of the first liquid and the second liquid;
    a second step of drying the separator substrate that has been impregnated with one of the first liquid and the second liquid;
    a third step of impregnating the separator substrate that has been dried with the other of the first liquid and the second liquid after the second step; and
    a fourth step of drying the separator substrate that has been impregnated with the other of the first liquid and the second liquid.

* * * * *